United States Patent
Flatz et al.

(10) Patent No.: US 8,103,658 B2
(45) Date of Patent: Jan. 24, 2012

(54) INDEX BACKBONE JOIN

(75) Inventors: Lothar Flatz, Oberriet (CH); Bjorn Kisbye Engsig, Hellerup (DK)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 12/618,672

(22) Filed: Nov. 13, 2009

(65) Prior Publication Data

US 2011/0119249 A1    May 19, 2011

(51) Int. Cl.
*G06F 17/00* (2006.01)
(52) U.S. Cl. .................. 707/714; 707/693; 707/769
(58) Field of Classification Search .............. 707/714, 707/769, 713, 693
See application file for complete search history.

(56) References Cited

U.S. PATENT DOCUMENTS 6,490,593 B2 * 12/2002 Proctor ..................... 1/1

* cited by examiner

*Primary Examiner* — Belix M Ortiz
(74) *Attorney, Agent, or Firm* — Hickman Palermo Truong & Becker

(57) ABSTRACT

Techniques described herein perform an index backbone join of data that is contained within two or more tables. Significantly, key data are selected from the indices constructed on the tables, and such data are filtered by the query-indicated criteria, before any data is selected from the tables themselves. Row identifiers of the rows remaining after the index filtering has been performed are then used to select the qualifying rows (only) from the tables. Data selected from the tables is joined to produce query results. Because all of the filtering is performed based on index entries prior to any table access, and because index access is typically much faster than table access, queries whose results require very large quantities of data from multiple tables can be performed much more quickly.

20 Claims, 2 Drawing Sheets

INDEX BACKBONE JOIN

FIELD OF THE INVENTION

The present invention relates to an enhancement of a query optimizer in a database system.

BACKGROUND

Worldwide, the amount of data stored in relational databases is growing. The amount of data is growing in terms of number of rows, simply because of an accumulation of historic data. Data is also growing in terms of increased row size because of additional information requirements. Additionally, data is growing because of the advent of standard software; tailor-made systems are replaced with highly generic standard software that covers many different customers' needs.

As this happens, the average relevance of one byte of stored information is decreasing, since information that is only needed on specific occasions, specific customers, or specific users is being added to databases.

On the other hand, due to the world-wide use of information available on the Internet, centralized services have become more and more important. More and more time-critical online applications are arriving. Users of these applications we want queries to return a result within one or two seconds. These two trends—more information, but less process time—contradict each other. Consequently, returning a result set in due time becomes increasingly difficult for the database system.

In database systems, a module called the query optimizer is assigned the task of calculating a fast access plan. The access plan depends to a significant extent on the selection criteria provided by the user. When a good selection criterion is given, the query optimizer uses that criterion by scanning an index. When only a bad selection criterion is given, the query optimizer produces a result set based on full table scans.

The most difficult situation arises when two or more medium selection criteria on different tables exist. A medium selection criterion, as used herein, is one that produces a small relative result set, but still a large absolute result set. A selection criterion that results in 5% of the rows or less is a small relative result set. To resolve such a criterion, the query optimizer should use an index scan (5% is an approximate number; the actual calculation of whether or not to use an index may be far more complex). Depending on the size of the table, 5% of the rows could still be tens of thousands rows or more, which is a large absolute result set. Very large result sets are less likely to be returned quickly in response to a query. Thus, a growing number of rows in database tables may result in an increasingly slower response time.

The following query may be considered for purposes of illustration. A user might want to obtain a result set that includes all people living in New York City who are also over the age of 65. The user might want to obtain this result set from a database that represents the complete U.S. population. The data might be stored in two tables. An "address" table contains, along with other columns, the columns "city" and "person_id." The column "person_id" refers to another table, "person." Table "person" contains, along with other columns, the column "age" and the column "person_id" as primary key. Under these circumstances, the query will involve two selection criteria: "city=New York City" and "age>65." The criterion "city=New York City" will yield roughly 3% of the U.S population, but above eight million rows in absolute numbers. The "over the age of 65" criterion represents roughly 13% of the U.S. population—that is, more than forty million rows.

Since the criterion "city=New York City" is applied on the table "address" and "age>65" goes against the table "person," the query optimizer cannot, under normal circumstances, combine these two filter criteria. Thus, the query optimizer has to choose, for a start point, either "address" or "person." Assuming that the query optimizer starts with the access to "address," the database will read all addresses in New York City. The database will then join in the "person" data. Next, the database uses the other filter, "age>65," which causes only 13% of the rows from the previous step to be kept; the rest are thrown away. In other words, 87% of the data read from table "address" is thrown away. This is not very efficient.

Even when the users wants to retrieve the first 100 rows of the result set, about 1300 rows still need to be read from table "address."

In actuality, the situation may be worse than is implied above. Most database systems have no means for just reading a row by itself. Instead, these database systems will always read, from disk or memory, an entire data block that contains multiple rows. Such a data block may contain less than 10 rows or more than 100 rows, depending on the size of a row. When rows are very large, few of them will fit in one database block. When data blocks contain few rows, the likelihood is increased that many blocks will need to be read to find the rows that are wanted. Increasing row size is one of the factors that damages performance.

A technique for dealing with these kinds of queries, which still provides good performance, is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
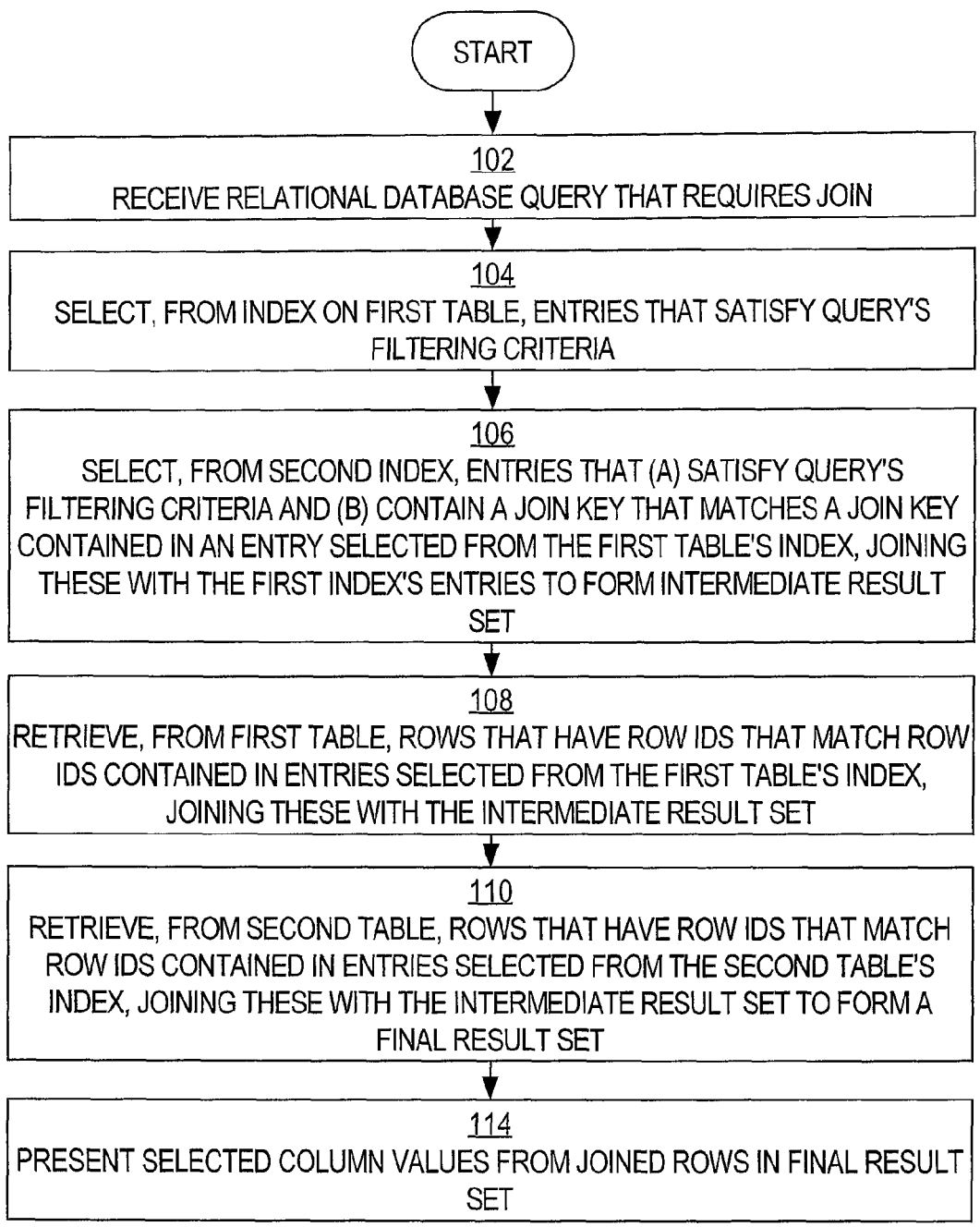
FIG. 1 is a flow diagram that illustrates an example of a technique for optimizing the execution of a relational database query using an index backbone join, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques described herein perform an index backbone join of data that is contained within two or more tables. Significantly, key data are selected from the indices constructed on the tables, and such data are filtered by the query-indicated criteria, before any data is selected from the tables themselves. Row identifiers of the rows remaining after the index filtering has been performed are then used to select the qualifying rows (only) from the tables. Data selected from the tables is joined to produce query results. Because all of the filtering is performed based on index entries prior to any table access, and because index access is typically much faster than table access, queries whose results require very large quantities of data from multiple tables can be performed much more quickly.

Index Retrieval Generally

Prior to a description of an embodiment of the invention, index retrieval is briefly discussed herein. The most commonly used index in a relational database is the B*Tree (also referenced as B+ Tree) index. In this type of index, the data is stored sorted in a tree-like manner, facilitating a fast look-up of information that is searched for in the "where" clause of a query. A B*Tree index is always associated with only one table and is built from the data of just that table. A given entry in a B*Tree index, called a key, is made of one or many columns. The query optimizer uses the index for retrieval in several ways. For the leading columns in an index entry, the query optimizer will scan the index in a fast tree-sorted way to search for filter criteria. This type of use is called "access" in the execution plan.

There might remain, in an index entry, columns that cannot be used for access. Those columns are picked up from the index if they are referred to in any way in the given SQL statement. All remaining columns that cannot be retrieved from an index are retrieved by a table access using a pointer—herein called a "row id"—picked from the index. Since the actual row other than an index entry contains all columns, all remaining columns will be retrieved.

Quite often, retrieving a row from a table is much more expensive than retrieving an entry from an index. In many real world environments, the retrieval of a row could take a hundred times more time than the retrieval of the same data from an index entry. There are two reasons for this difference in retrieval time. First, the index entry is commonly much smaller than a row; therefore, there are more entries in an index block on disk than there are rows in a table block on disk. Second, the index entry is sorted by the search criteria that are used to access the index. Quite often, a user wants to retrieve all rows matching those criteria. Index entries that match the same sort criterion are clustered in neighboring index blocks. Therefore, it is more likely that an index block can be re-used multiple times for a given query. The high re-usability of index blocks may be contrasted the low re-usability of rows of a table block, in which the sequence of rows is not predetermined.

Index Backbone Join

The performance of the execution of the example query discussed in the Background section above can be improved using techniques described herein. Referring to that example query, in one embodiment of the invention, the technique involves joining the table "address" and "person" column based on "person_id" stored in "address." A B*Tree Index is created based on "person_id" and "age" in table "person." Age is the first entry in the index and is used as access criterion. As a result, the query optimizer can filter out people of the wrong age using the cheap index access during the join process, avoiding an unnecessary, expensive table access.

This technique limits the access to the "person" table to the absolute minimum. However, the more expensive access to table "address" still needs to be considered. Under previous approaches, 87% more rows than were finally needed were read from "address." From table "address," at least "city" and "person_id" need to be selected. When an index is created based on "city" and "person_id," table access to table "address" is avoided, provided that "person_id" is the only column that will be retrieved from table "address." If another column, like "zip," needs to be retrieved, then the table will still need to be accessed, although, alternatively, "zip" could be included in the index as well.

If all columns of table "address" were included in the index, then the index would be severely compromised by sacrificing the small entry size. Furthermore, increased overhead on DML and other side effects might result. Significantly, of all columns of "address," only columns "city" and "person_id" are essential to the execution plan. "City" is used as a filter to access the index. "Person_id" may be selected from the index and joined right in "person" using the other index. Then the "age>65" filter may be applied. Only after all filters have been applied are the tables "address" and "person" used. Consequently, the number of rows to be retrieved from table "address" is reduced by a factor of 87%.

In this small example, only one row id is kept for further use. For other queries, keeping multiple row ids and delaying the table access until all good filters have been applied might be wise. In one embodiment of the invention, the query optimizer only uses one row id at any one time and retrieves all columns from one table before the optimizer accesses any other table or its corresponding index.

Set forth below is the order of events that might be performed when an index backbone join technique, as described herein, is not used:

1. Access to index on "address" using "city" as access criterion
2. Access to table "address" with index row id selecting "person_id" from the row
3. Access to index on "person" using "person_id" for access and filter on "age>65" herewith doing a nested loop join
4. Access to table "address" with index row id Or, if a hash join were used, then the scenario would look like this:

1. Full table scan on table "address" using "city"
2. Full table scan on table "person" using "age"
3. Doing a hash join on both result sets Where good relative filter criteria, such as city and age, are available, this hash join algorithm is not likely to be used. The hash join algorithm is presented here merely for reasons of comparison to the index backbone join hash variant discussed below. As is discussed above, this approach results in 87% of retrieved addresses being thrown away.

In contrast, use of the index backbone join technique described herein would involve the following steps:

1. Access to index on "address" using "city," selecting "person_id" from the index
2. Access to index on "person" using "person_id" for access and apply the filter on "age" herewith doing a nested loop join. This constructs an intermediate result that contains at least the following columns: "person_id," "age," "city," row id of "person," row id of address." This produces the backbone of the result set constructed; hence the name "backbone join."
3. Access to table "address" with index row id (delayed)
4. Access to table "person" with index row id There is an alternative scenario for the index backbone where a hash join is used to combine the index data:

1. Access to index on "address" using "city," selecting "person_id" from the index
2. Access to index on "person" using "age," selecting "person_id" from the index
3. Combine the two result sets using a hash join based on "person_id." This constructs an intermediate result that contains at least the following columns: "person_id," "age," "city," row id of "person," row id of "address."
4. Access to table "address" with index row id (delayed)
5. Access to table "person" with index row id This results in no rows of the tables but only index entries being thrown away, which is under most circumstances much cheaper than throwing away rows. Which variant the query optimizer uses will depend on cost calculations and availability of indices.

Under circumstances in which the query optimizer is not able to process a query in the proposed way, such a query can still be coded manually by aliasing the row ids and keeping more than one row for further use. For example, if the conventional query looks like:

```
SELECT p.name, a.zip ..
FROM address a,
    Person p
WHERE a.person_id = p.id
    AND a.city ='New York City'
    AND p.age > 65;
``` then a manual simulation of an index backbone join would look like:

```
SELECT p.name, a.zip ..
FROM address a,
    Person p,
    (SELECT a1.rowid a_rowid,
            p1.rowid p_rowid
     FROM address a1,
          Person p1,
     WHERE a1.person_id = p1.id
       AND a1.city ='New York City'
       AND p1.age > 65) I
WHERE a.rowid = i.a_rowid
  AND p.rowid = i.p_rowid;
```

Tests with some manually rewritten sample queries have shown up to a 2000% improvement in performance due to fewer buffer gets and physical reads. The foregoing technique assumes the existence of indices that contain join keys as well as search keys. The search key indexes are likely to exist anyway and can be reused by adding filter and/or join columns to the index. Therefore, there are virtually no additional indices needed, and DML is not slowed.

Applications can benefit from an index backbone join implemented in the query optimizer. There is no need to change application code. Embodiments of the invention permit time-critical queries to execute more quickly. As time passes, there will be more and more time-critical queries in the future. Notably, in a call center, these queries can takes a long time and get a lot of attention. An improvement in this area will be very visible to the customer and will not pass unnoticed. An index backbone join will speed up critical queries significantly and will provide a very visible competitive edge.

Example Flow

FIG. 1 is a flow diagram that illustrates an example of a technique for optimizing the execution of a relational database query using an index backbone join, according to an embodiment of the invention. In block 102, a relational database query is received. For example, a database server instance may receive, from a user or application, a structured query language (SQL) query that is to be executed against the data stored in two or more relational database tables in a database in order to obtain a result set. In one embodiment of the invention, the query specifies that a join (either explicit or implicit) is to be performed by selecting rows from two different relational tables; each such table may be specified in a FROM clause (e.g., "FROM address a, person p"). In one embodiment of the invention, the query specifies (typically, in a WHERE clause) a key column from each table that is to be used to determine which rows of each table are to be joined together for the query results (e.g., "WHERE a.person_id=p.id"). Below, these key columns are referred to as the "join keys." In one embodiment of the invention, the query additionally specifies one or more filter criteria that are to be applied to the rows. Typically, these filter criteria also will be specified in a WHERE clause (e.g., "WHERE a.city='New York City' AND p.age>65"). One or more of the filter criteria may operate on columns from the first table (e.g., "a.city"), and one or more of the filter criteria may operate on columns from the second table (e.g., "p.age"). The filter criteria that operate on the first table are called the "first table filter criteria" below, and the filter criteria that operate on the second table are called the "second table filter criteria" below. In this way, the query specifies that only rows that satisfy the filter criteria are to be returned as query results.

In block 104, all index entries (and only those index entries) that satisfy all of the query's first table filter criteria are selected from an index that has been created on the first table (the "first table's index"). Significantly, this operation involves a relatively fast index access rather than a comparatively slower table access. For example, a database server instance may select, from a B*Tree index on the first table, all index entries that satisfy the first table filter criteria. More specifically, if the first table filter criteria were "a.city='New York City'", then the database server instance would select, from the B*Tree index on the "address" table (to which the pseudonym "a" refers), all index entries (and only those index entries) that indicated that the value of the "city" column in some corresponding row of the "address" table was "New York City." Each of the selected index entries also contains a reference to some corresponding row in the first table. Typically, this reference will be a "row id" that is specified in each selected index entry. Each of the selected index entries additionally contains a value for the join key from the corresponding row in the first table (e.g., "person_id" in the "address" table).

In block 106, all index entries (and only those index entries) that both (a) indicate a join key value that matches a join key value in an index entry selected from the first table's index in block 104 and (b) satisfy all of the query's second table filter criteria are selected from an index that has been created on the second table (the "second table's index"). Significantly, this operation involves a relatively fast index access rather than a comparatively slower table access. For example, a database server instance may select, from a B*Tree index on the second table, all index entries that both (a) indicate a join key value that matches at least one join key value indicated in an index entry selected form the first table's index and (b) satisfy the second table filter criteria. More specifically, if the join criteria specified in the query were "a.person_id=p.id," and if the second table filter criteria were "p.age>65", then the database server instance would select, from the B*Tree index on the "person" table (to which the pseudonym "p" refers), all index entries (and only those index entries) that indicated both (a) that the value of the "age" column in some corresponding row of the "person" table was greater than 65 and (b) that the value of the "id" column in that same corresponding row of the "person" table matched the value of a "person_id" column within some index entry previously selected from the first table's index. Each of the selected index entries also contains a reference to some corresponding row in the second table. Typically, this reference will be a "row id" that is specified in each selected index entry. In one embodiment of the invention, the index entries selected in block 104 and the index entries selected in block 106 are joined together based on the join key values to form an intermediate result set.

In block 108, a table access to the first table is performed to retrieve, from the first table, all rows (and only those rows) that have a "row id" that matches a "row id" of an index entry selected from the first table's index in block 104. For example, the database server instance may select, from the first table, only those rows in which the value of the "row id" column is also found in the "row id" column specified in some index entry previously selected from the first table's index. In doing so, the database server instance does not need to perform a full table scan on the first table, or apply any of the filter criteria on the first table's rows, since the database server instance is already aware of which rows should be selected from the first table based solely on those row's indicated "row id" values. That way, any remaining information that is still required is joined into the intermediate result set.

In block 110, a table access to the second table is performed to retrieve, from the second table, all rows (and only those rows) that have a "row id" that matches a "row id" of an index entry selected from the second table's index in block 106. For example, the database server instance may select, from the second table, only those rows in which the value of the "row id" column is also found in the "row id" column specified in some index entry previously selected from the second table's index. In doing so, the database server instance does not need to perform a full table scan on the second table, or apply any of the filter criteria on the second table's rows, since the database server instance is already aware of which rows should be selected from the second table based solely on those row's indicated "row id" values. That way, any remaining information that is still required is joined into the intermediate result set. The intermediate result set is now complete and becomes the final result.

In one embodiment of the invention, information concerning the row ids of the pairs of rows from each table that have the same join key value has already been determined in block 106, since only those of the second table's index entries that have a join key value that matches a join key value from a selected first table index entry are selected in block 106. Thus, in one embodiment of the invention both (a) the "row id" indicated in the second table's index entry that matches a selected first table's index entry and (b) the "row id" indicated in that matching first table's index entry are stored as a pair in block 106 for later use in performing the join. In such an embodiment of the invention, the two rows having the "row id" values indicated in each such pair are joined.

In block 114, values of selected columns specified in the query (or values of all columns, if no selected columns have been specified in the query) from each of the joined rows are returned as query results. Typically, these selected columns, if any are specified, are specified in the SELECT clause of the query. For example, if the SELECT clause of the query specifies selected columns "p.name" (referring to the "name" column of the "person" table) and "a.zip" (referring to the "zip" column of the "address" table), then, for each joined row formed, the database server instance may return, as query results of the query received in block 102, values of the "name" and "zip" columns in that joined row. Thus, referring to the example query discussed previously, the query results may indicate the name and zip of each person in New York City who is also over 65 years old (and only those people).

As is discussed above, using the foregoing technique, the query results are computed without performing a table scan on either the first or second tables before all filtering is complete. Instead, much faster index scans are performed using the indices (e.g., B*Tree indices) that have been created on those tables. Instead of applying the query's filter criteria to the table rows, the query's filter criteria are applied to the index entries of each index before any table access occurs. Thus, techniques for performing an index backbone join have been described.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
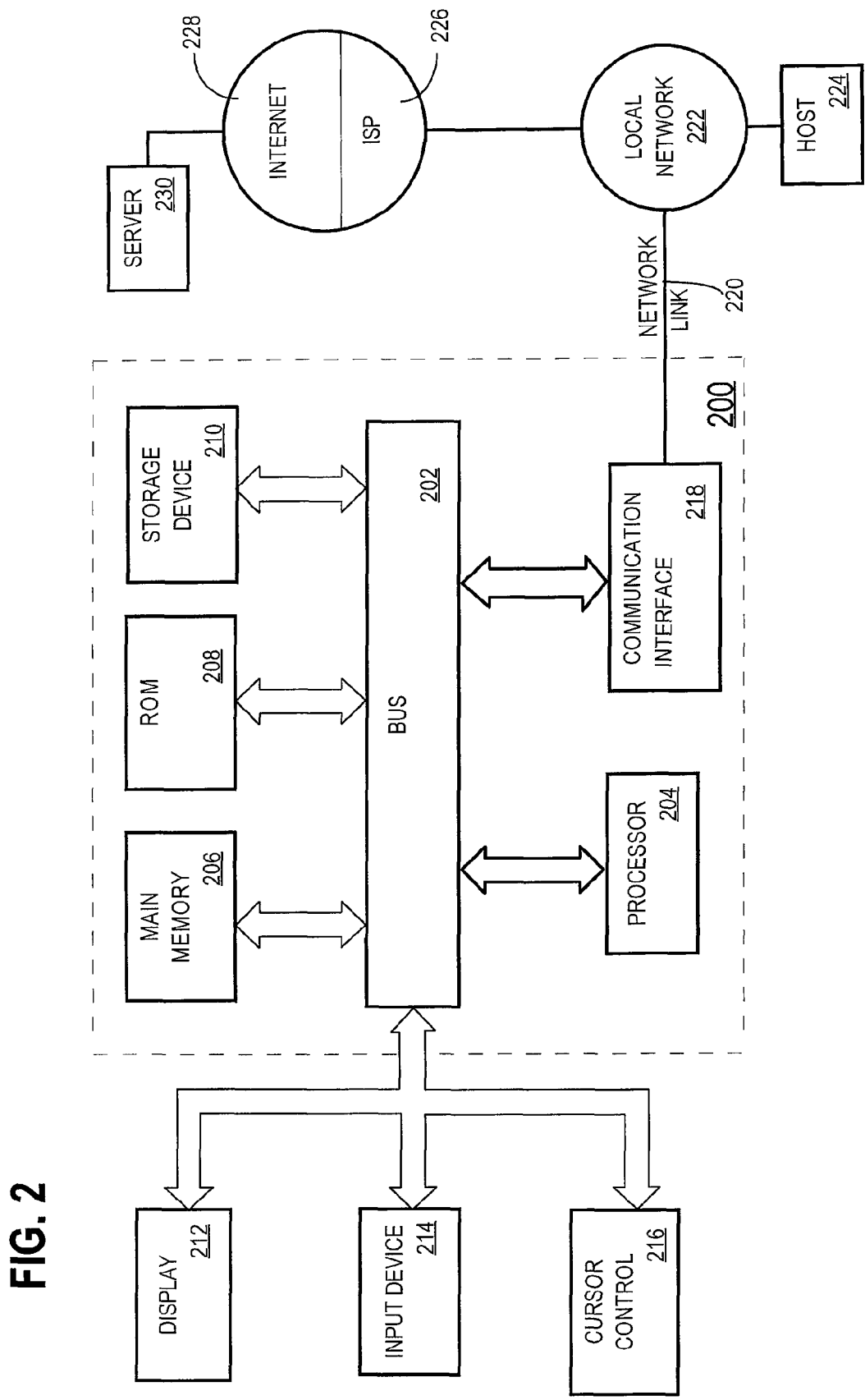
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
receiving a query that specifies at least that (a) data are to be selected from at least a first table and a second table, (b) that data selected from the tables are to be filtered based on values contained in a first column of the first table, and (c) that data selected from the tables are to be filtered based on values contained in a second column of the second table;
accessing a first index that has been built on the first table to obtain a first set of index entry columns that also contain row identifiers;
filtering the first set based on values from the first index that correspond to values in the first column;
accessing a second index that has been built on the second table to obtain a second set of index entry columns that also contain row identifiers;
filtering the second set based on values from the second index that correspond to values in the second column;

joining and filtering the second set to the first set based on a join column that is present in both the first set and the second set;

after filtering the first and second sets, selecting (a) a first group of rows from the first table based on row identifiers in the first set and (b) a second group of rows from the second table based on row identifiers in the second set, thereby producing an intermediate result;

joining both the first group of rows and the second group of rows with the intermediate result to produce a result set; and storing the result set in a computer-readable memory;

wherein the steps are performed by one or more special-purpose computing devices.

2. The method of claim 1, wherein the step of accessing the first index comprises performing an index access on a B*Tree index that indicates, for each particular row of the first table, a value of the first column in that particular row.

3. The method of claim 1, wherein the step of filtering the second set comprises:

performing an index access on a B*Tree index that indicates, for each particular row of the second table, a value of a join key in that particular row; and selecting, from the B*Tree index, only those of the index entries that both (a) specify values that satisfy filter criteria specified in the query and (b) specify join key values that match join key values of index entries from the first index that were not filtered out by the filtering of the first set.

4. A computer-implemented method comprising steps of:

selecting, from a first index created for a first table, a first index entry set consisting of index entries that satisfy first criteria specified in a query;

selecting, from a second index created for a second table, a second index entry set consisting of index entries that both (a) satisfy second criteria specified in the query and (b) specify a first join key value that matches a second join key value specified in at least one index entry contained in the first index entry set;

constructing an intermediate result set based on a join between the first index entry set and the second index entry set;

selecting a first set of rows from the first table based on row identifiers that are specified by index entries contained in the first index entry set;

selecting a second set of rows from the second table based on row identifiers that are specified by index entries contained in the second index entry set;

joining, into the intermediate result set, rows from the first set of rows and the second set of rows based on (a) join key values specified in the rows from the first set of rows and (b) join key values specified in the rows from the second set of rows, thereby forming a set of joined rows; and presenting, as results of the query, at least some data from each row in the set of joined rows;

wherein the steps are performed by one or more special-purpose computing devices.

5. The method of claim 4, wherein the step of selecting the first index entry set from the first index comprises performing an index access on a B*Tree index that indicates, for each particular row of the first table, a value of a particular column in that particular row; wherein the particular column is specified in a WHERE clause of the query.

6. The method of claim 4, wherein the step of selecting the second index entry set from the second index comprises performing an index access on a B*Tree index that indicates, for each particular row of the second table, both (a) a value of a particular column in that particular row and (b) a value of a particular join key for that particular row; wherein the particular column and the particular join key are specified in one or more WHERE clauses of the query.

7. The method of claim 4, wherein the steps are performed without performing a full table scan on either the first table or the second table, but with performing either a full or fast full index scan.

8. The method of claim 4, wherein the steps are performed (a) without determining, by reading values from the first table, whether any row in the first table satisfies the first criteria and (b) without determining, by reading values from the second table, whether any row in the second table satisfies the second criteria.

9. The method of claim 4, further comprising:

in response to determining that a particular index entry in the second index both (a) specifies a value that satisfies the second criteria and (b) specifies a first join key value that matches a second join key value specified in a particular index entry contained in the first index entry set, storing pair data that associates a first row identifier with a second row identifier;

wherein the first row identifier is specified in the particular index entry contained in the first index entry set; and wherein the second row identifier is specified in the particular index entry in the second index.

10. The method of claim 9, wherein the step of joining together rows from the first set of rows and the second set of rows comprises joining (a) first columns from a row that has a first row identifier with (b) second columns from a row that has a second row identifier that is associated with the first row identifier in the pair data; wherein, as a result of joining the first columns and the second columns, a joined row that contains both the first columns and the second columns is produced; wherein both the first columns and the second columns are specified in a SELECT clause of the query.

11. One or more storage media storing instructions which, when executed by one or more computing devices, cause performance of steps comprising:

receiving a query that specifies at least that (a) data are to be selected from at least a first table and a second table, (b) that data selected from the tables are to be filtered based on values contained in a first column of the first table, and (c) that data selected from the tables are to be filtered based on values contained in a second column of the second table;

accessing a first index that has been built on the first table to obtain a first set of index entry columns that also contain row identifiers;

filtering the first set based on values from the first index that correspond to values in the first column;

accessing a second index that has been built on the second table to obtain a second set of index entry columns that also contain row identifiers;

filtering the second set based on values from the second index that correspond to values in the second column;

joining and filtering the second set to the first set based on a join column that is present in both the first set and the second set;

after filtering the first and second sets, selecting (a) a first group of rows from the first table based on row identifiers in the first set and (b) a second group of rows from the second table based on row identifiers in the second set, thereby producing an intermediate result;

joining both the first group of rows and the second group of rows with the intermediate result to produce a result set; and storing the result set in a computer-readable memory.

12. The one or more storage media of claim 11, wherein the step of accessing the first index comprises performing an index access on a B*Tree index that indicates, for each particular row of the first table, a value of the first column in that particular row.

13. The one or more storage media of claim 11, wherein the step of filtering the second set comprises:

performing an index access on a B*Tree index that indicates, for each particular row of the second table, a value of a join key in that particular row; and selecting, from the B*Tree index, only those of the index entries that both (a) specify values that satisfy filter criteria specified in the query and (b) specify join key values that match join key values of index entries from the first index that were not filtered out by the filtering of the first set.

14. One or more storage media storing instructions which, when executed by one or more computing devices, cause performance of steps comprising:

selecting, from a first index created for a first table, a first index entry set consisting of index entries that satisfy first criteria specified in a query;

selecting, from a second index created for a second table, a second index entry set consisting of index entries that both (a) satisfy second criteria specified in the query and (b) specify a first join key value that matches a second join key value specified in at least one index entry contained in the first index entry set;

constructing an intermediate result set based on a join between the first index entry set and the second index entry set;

selecting a first set of rows from the first table based on row identifiers that are specified by index entries contained in the first index entry set;

selecting a second set of rows from the second table based on row identifiers that are specified by index entries contained in the second index entry set;

joining, into the intermediate result set, rows from the first set of rows and the second set of rows based on (a) join key values specified in the rows from the first set of rows and (b) join key values specified in the rows from the second set of rows, thereby forming a set of joined rows; and presenting, as results of the query, at least some data from each row in the set of joined rows;

wherein the steps are performed by one or more special-purpose computing devices.

15. The one or more storage media of claim 14, wherein the step of selecting the first index entry set from the first index comprises performing an index access on a B*Tree index that indicates, for each particular row of the first table, a value of a particular column in that particular row; wherein the particular column is specified in a WHERE clause of the query.

16. The one or more storage media of claim 14, wherein the step of selecting the second index entry set from the second index comprises performing an index access on a B*Tree index that indicates, for each particular row of the second table, both (a) a value of a particular column in that particular row and (b) a value of a particular join key for that particular row; wherein the particular column and the particular join key are specified in one or more WHERE clauses of the query.

17. The one or more storage media of claim 14, wherein the steps are performed without performing a full table scan on either the first table or the second table, but with performing either a full or fast full index scan.

18. The one or more storage media of claim 14, wherein the steps are performed (a) without determining, by reading values from the first table, whether any row in the first table satisfies the first criteria and (b) without determining, by reading values from the second table, whether any row in the second table satisfies the second criteria.

19. The one or more storage media of claim 14, wherein the steps further comprise:

in response to determining that a particular index entry in the second index both (a) specifies a value that satisfies the second criteria and (b) specifies a first join key value that matches a second join key value specified in a particular index entry contained in the first index entry set, storing pair data that associates a first row identifier with a second row identifier;

wherein the first row identifier is specified in the particular index entry contained in the first index entry set; and wherein the second row identifier is specified in the particular index entry in the second index.

20. The one or more storage media of claim 14, wherein the step of joining together rows from the first set of rows and the second set of rows comprises joining (a) first columns from a row that has a first row identifier with (b) second columns from a row that has a second row identifier that is associated with the first row identifier in the pair data; wherein, as a result of joining the first columns and the second columns, a joined row that contains both the first columns and the second columns is produced; wherein both the first columns and the second columns are specified in a SELECT clause of the query.

* * * * *